United States Patent [19]

Veenstra

[11] Patent Number: 5,509,533
[45] Date of Patent: Apr. 23, 1996

[54] PACKAGE FOR STORING AND DISPLAYING A PLURALITY OF BOX-SHAPED ARTICLES, MORE PARTICULARLY DATA CARRIERS SUCH AS FLOPPY DISKS AND THE LIKE

[76] Inventor: Hendrik Veenstra, Zwartwatersweg 160, Assen, Netherlands, 9402 SX

[21] Appl. No.: 182,163

[22] PCT Filed: May 25, 1993

[86] PCT No.: PCT/NL93/00106

§ 371 Date: Jan. 25, 1994

§ 102(e) Date: Jan. 25, 1994

[87] PCT Pub. No.: WO93/24931

PCT Pub. Date: Dec. 9, 1993

[30] Foreign Application Priority Data

May 26, 1992 [NL] Netherlands ............ 9200931

[51] Int. Cl.⁶ ................................ B65D 85/00
[52] U.S. Cl. ................ 206/425; 206/740; 229/72
[58] Field of Search ................ 206/45, 45.23, 206/425, 444, 308.1, 308.3; 190/110; 229/72

[56] References Cited

U.S. PATENT DOCUMENTS

| 909,734 | 1/1909 | Zoerb | 229/72 |
|---|---|---|---|
| 986,000 | 3/1911 | Hart | 229/72 |
| 1,731,950 | 10/1929 | Tanner | 206/45 |
| 3,114,492 | 12/1963 | Engstrom | 206/425 |
| 4,444,314 | 4/1984 | Jacobsson | 206/45 |
| 4,589,544 | 5/1986 | Schweinsberg | 206/45 |
| 4,730,727 | 3/1988 | Petroff | 206/311 |
| 4,871,066 | 10/1989 | LaWall | 206/425 |
| 5,064,069 | 11/1991 | Su | 206/425 |
| 5,271,502 | 12/1993 | Chang | 206/425 |

FOREIGN PATENT DOCUMENTS

| 0126980 | 12/1984 | European Pat. Off. |
|---|---|---|
| 1117330 | 5/1956 | France . |
| 1202752 | 10/1965 | Germany . |
| 3622140 | 2/1988 | Germany . |
| 172672 | 12/1921 | United Kingdom . |
| 8911719 | 11/1989 | WIPO . |

*Primary Examiner*—David T. Fidei
*Attorney, Agent, or Firm*—Peter L. Michaelson; Jeffery J. Brosemer

[57] ABSTRACT

Storage and display package for a plurality of box-shaped articles (25), for instance floppy disks and the like, and comprising a plurality of sheaths, one for each box-shaped article, each sheath being provided with an insertion opening, a back face part (1) having a first longitudinal side, a top wall part (8, 15) hinged to the back face part, having a longitudinal edge which recedes relatively to the first longitudinal side, and a coupling part (3), extending strip-shaped at the back of the back face part from the first to a second opposite longitudinal side of the back face part, the coupling part extending under the top wall part of the subjacent sheath and extending to said second longitudinal side, to which a fold-back part (7) is connected by means of a hinge part (4–6), extending in the direction of the first longitudinal side under the top wall part, so that the back face part and the coupling part form a closed loop around the top wall part of the subjacent sheath.

15 Claims, 3 Drawing Sheets

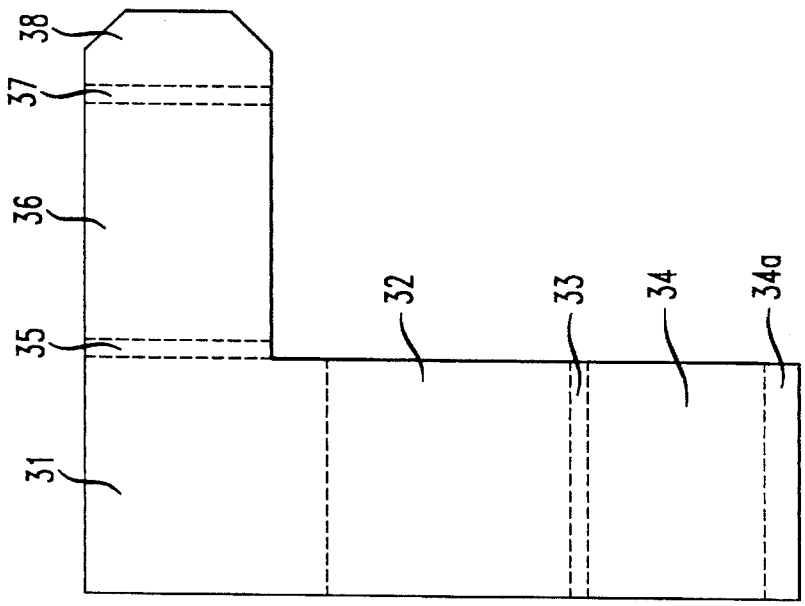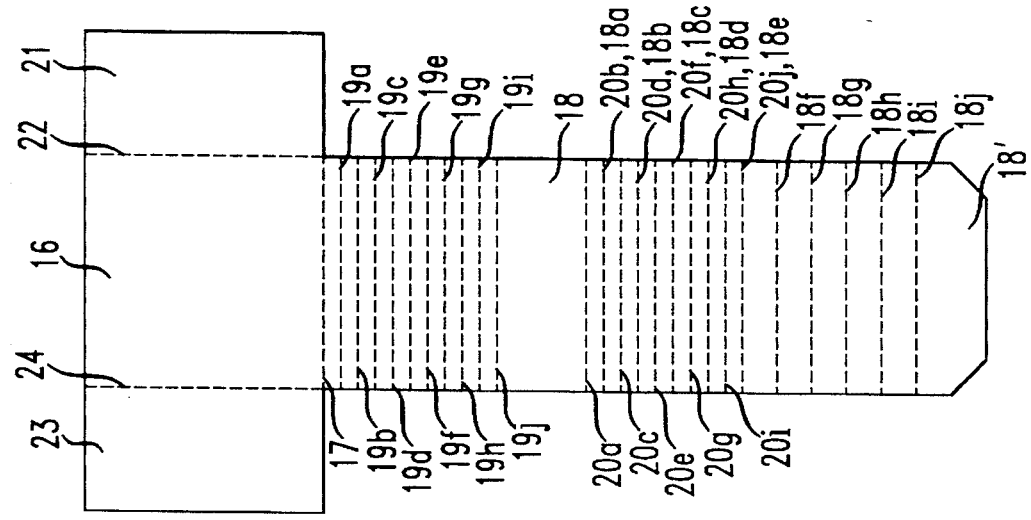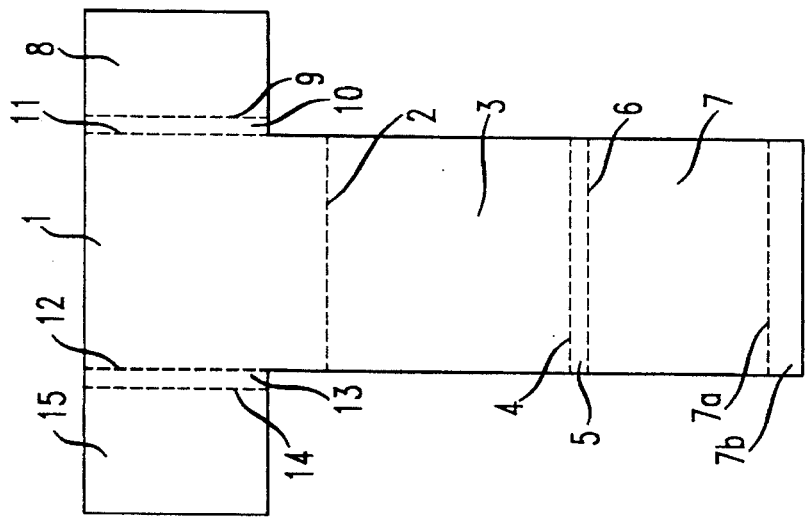

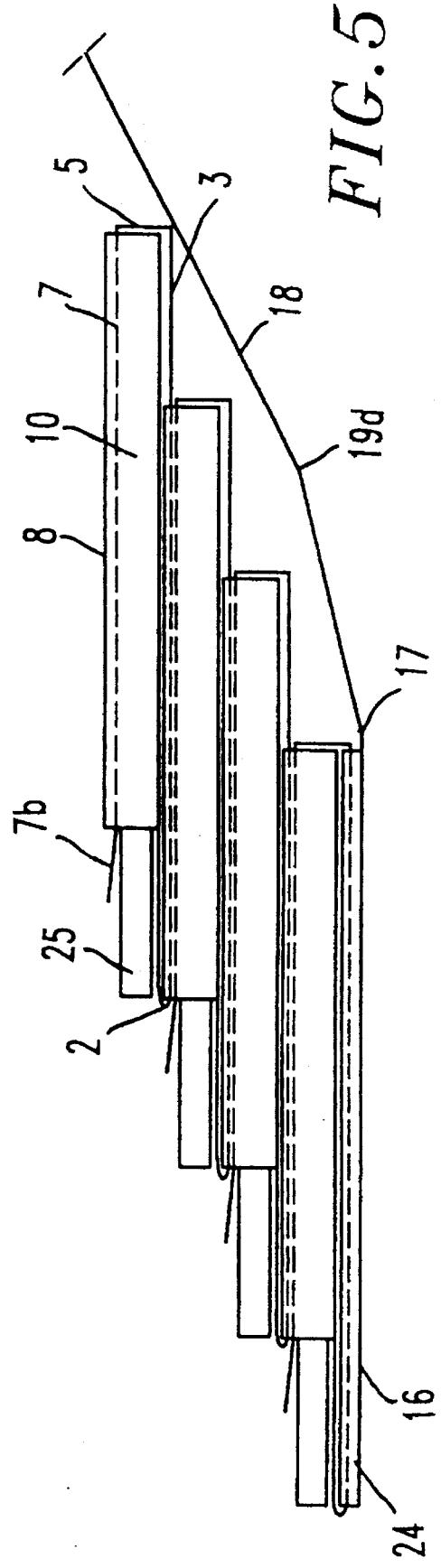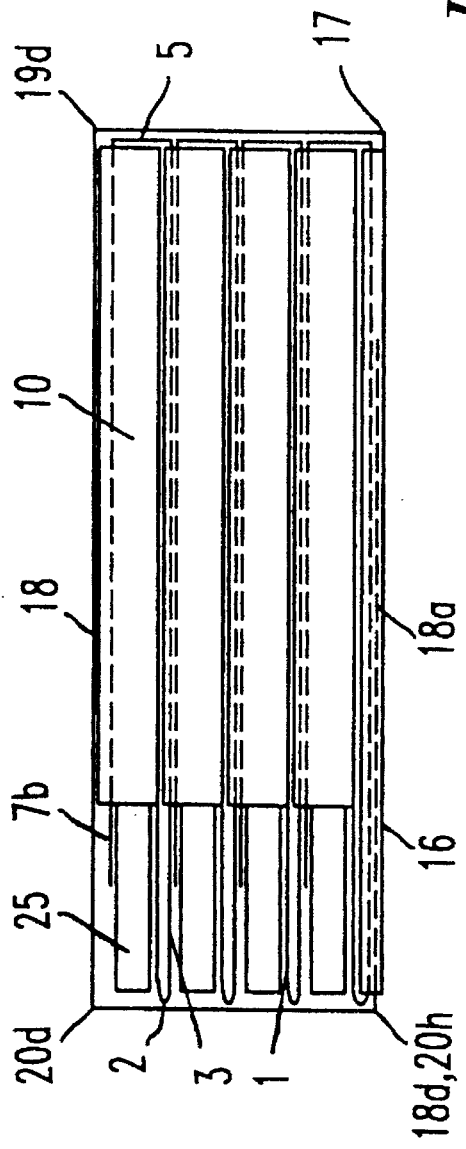

PACKAGE FOR STORING AND DISPLAYING A PLURALITY OF BOX-SHAPED ARTICLES, MORE PARTICULARLY DATA CARRIERS SUCH AS FLOPPY DISKS AND THE LIKE

BACKGROUND OF THE INVENTION

The invention relates to a package for storing and displaying a plurality of box-shaped articles, more particularly data carriers such as floppy disks and the like, which package comprises receiving means in the form of a plurality of sheaths, one for each box-shaped article, each sheath being provided with:

an insertion opening, a back face part having a first longitudinal side which forms a first edge of the insertion opening, a top wall part having a longitudinal edge which forms a second edge of the insertion opening and recedes relatively to the first longitudinal side, and a coupling part, extending strip-shaped, at the back, relatively to the top wall part, of the back face part, from the first longitudinal side in the direction of a second, opposite longitudinal side of the back face part, the coupling part extending under the top wall part of the subjacent sheath.

DESCRIPTION OF THE PRIOR ART

Such a package is disclosed in DE-A-36 22 140. In the store position, the sheaths with the articles stored therein are positioned one directly above the other, which yields a compact, block-shaped package. In the display position, the various sheaths are shifted relatively to each other so as to overlap like roof tiles, so that, as a result of the second receding edge of the insertion opening, a surface-shaped part of each article is visible. This surface-shaped part may contain information about the article and the contents thereof, so that a specific article can be selected and taken out of the package without affecting the other articles in their stored positions.

In both the extreme display position and the store position, the various sheaths must be arrested relatively to each other. In the display position, this is effected by the transition between the back face part and the coupling part striking the receding edge of the top wall part, which edge forms the second edge of the insertion opening. Movement to the store position is limited in that a first lip, hinged on both sides of the back wall part and extending downwards, folded back under the top wall part of a subjacent sheath, strikes a second lip, hinged on both sides of that back wall part and extending downwards, folded back under the back face part of that subjacent sheath. To permit the superjacent sheath to move relatively to the subjacent sheath from the store position to the display position, an open slot should be present in the sides of the subjacent sheath, having a length equal to the sum of the desired moving distance and the height of the firs lip. This means that the sides of those sheaths are of open design through the greater part of their lengths, so that the protection provided to the stored articles from the sides is relatively small, and, further, the insides of the sheaths are susceptible to contamination.

Further, when the sheath reaches the store position, arresting takes place as the first lips laterally strike the second lips, in other words through a very small contact, which can easily lead to wear, damage and may even cause one or more lips to be torn loose. As a consequence, not only does the arrest in the store position become less accurate, but he coupling between two sheaths is also affected, because the lips, together with the coupling part, are also involved therein.

A first lip on the back face part of a superjacent sheath, extending between the top wall part and the back face part of a subjacent sheath, is covered within the subjacent sheath by the coupling part of the superjacent sheath. Thus, this coupling part of the superjacent sheath is part of the internal surface of the subjacent sheath. This means that when the superjacent sheath is moved relatively to the subjacent sheath, at least a portion of the internal surface of the subjacent sheath moves relatively to the article stored in that sheath. The friction or abrasion involved therein may lead to the formation of abrasive particles and hence cause damage o the article stored, particularly if this is an electronic data carrier such as a floppy disk. Moreover, in order to enable movement to the display position, the free lower edge of the coupling part of the superjacent sheath should be spaced from the bottom of the subjacent sheath by a distance at least equal to the desired moving distance. When moved, this free end edge of the coupling part thus forms a moving stop shoulder relative to the article stored in the subjacent sheath, which may block the desired movement at least partially and lead to damage to the article stored.

SUMMARY OF THE INVENTION

The object of the invention is to provide a storage and display package of the type described in the opening paragraph hereof which does not present the above-described problems.

This is realized if, according to the invention, the top wall part is hinged on a longitudinal side of the back face part, which longitudinal side extends transversely to said first longitudinal side, and the coupling part extends to said second longitudinal side of the back face part, where a fold-back part is connected to the coupling part by means of a hinge part, the fold-back part extending in the direction of said first longitudinal side of the back face part under the top wall part, so that the back face part and the coupling part form a closed loop around the top wall part of the subjacent sheath.

Through these measures, a package is provided wherein an arrest is effected both in the store position and in the display position in that a transition between two surface-shaped parts strikes a free longitudinal edge of an otherwise surface-shaped part. In the display position, this is effected in that the transition between the coupling part and the back face part strikes the longitudinal edge of the top wall part, which longitudinal edge forms the second edge of the insertion opening, while in the display position the transition between the coupling part and the fold-back part strikes the other longitudinal edge of the top wall part. The latter can be connected to the back face part by means of continuous hinge means, so that the sheath is provided with closed sides. Further, the coupling part of a superjacent sheath will, upon moving the latter, move relatively to a subjacent sheath between the fold-back part and the top wall part of the subjacent sheath; hence, a free stop shoulder, moving within the sheath, is not present.

The article stored in a sheath is mainly surrounded by faces that are stationary relatively to that article during movement of a sheath. This effect can be further optimized if, in accordance with a further embodiment of the invention, the fold-back part continues to beyond the receding second edge, formed by the top wall part, of the insertion opening. The data carrier can then be inserted between the back face and the fold-back part, while the strip of the fold-back art, continuing to beyond the second receding edge, may be bent upwards slightly so as to simplify insertion of a data carrier.

If the various sheaths with box-shaped articles are moved together to form a block-shaped stack, this stack can be accommodated in a separate box. According to a further embodiment of the invention, however, it is preferred that a wrapping strip i present, connected to the back face part or the coupling part of a first sheath and capable of being wrapped around a plurality of superjacent further sheaths and coupled to the first-mentioned sheath to form a closed wrapper.

The package according to the invention as described above with reference to, among other things, a number of possible embodiments, can be manufactured in many ways and from various materials. The cost and required operations can be kept low, particularly if each sheath and the wrapping strip are each made from a blank of cardboard, paper, plastics, metal sheet or a similar material with inherent stiffness.

In this connection, it is preferred that the blank for a sheath comprises a rectangular back face part, a coupling part connected to the back face part by a hinge means, a fold-back part connected o the coupling part by means of a hinge part that is parallel to the first hinge means, and a first and second top wall part respectively, connected to the back face part by a first and second lateral hinge part respectively, perpendicular to the first hinge means. A sheath can then be formed in a simple manner by folding back the back face part with the top wall parts about the first hinge means to abut against the coupling part and folding back to fold-back part about the second hinge means to abut against the back face part, whereupon the top wall parts are folded over about heir hinge means in the direction of the fold-back part. For interconnecting the various sheaths, the cop wall parts are not folded over until the coupling part of a next sheath has been placed on the fold-back part. The op wall parts are thus hooked into the slit between the back face part and the coupling part of a superjacent sheath. This does not apply to the two top wall parts of the top sheath only. To prevent those folded-over parts from springing back unintentionally, they can be interconnected by means of, for instance, an adhesive strip. Another possibility is to provide one top wall part with a projecting lip capable of engaging in a slot provided in the other top wall part.

According to another embodiment, it is also possible that a one-piece top wall part is connected to the back face part by means of a first lateral hinge part perpendicular to the first hinge means, and that an insertion part is connected to the top wall part by a second lateral hinge part parallel to the first lateral hinge part. After the top wall part has been folded over, the insertion part should be inserted into the slit between the back face part and the coupling part.

It is observed that by connecting the top wall part or the top wall parts to the back face part by hinge means, an additional, considerable advantage is obtained. Because the top wall part or the top wall parts are only inserted into the loop between the back face part and the coupling part, they can likewise be pulled from it at any desired moment, so that it is always possible to remove one or a plurality of sheaths. Obviously, this construction also implies that a number of coupled sheaths can be enlarged at any desired moment by one or a number of additional sheaths.

If the box-shaped means are relatively thin, each hinge means can be formed in a simple manner by a folding line. However, in particular in the case of somewhat thicker box-shaped articles, it is preferred that the first hinge means is formed by a folding line, and the hinge par as well as the first and second lateral hinge pars are formed by a panel connected by folding lines to he adjacent parks o be hingedly connected, so that the passage of the insertion opening can be matched to the cross section of a box-shape article to be accommodated.

According to a further embodiment of the invention, for forming the wrapping strip it is preferred that the blank for a wrapping strip comprises a rectangular back part whose dimensions correspond to those of the back face part of a sheath to be enveloped, said back part having coupling flaps connected thereto along two opposite sides by means of first folding lines and a wrapping part connected thereto along a third side by means of a second folding line, said wrapping part having a width at least equal to the back part dimension parallel to the second folding line and a length at leas equal to the sum of the back part dimension perpendicular to the second folding line and twice the thickness of a stack of maximally receivable sheaths with box-shaped articles, the wrapping part comprising at least a group of third folding lines extending parallel to the second folding line and spaced apart at a distance corresponding to the thickness of a sheath with box-shaped article. A wrapping strip made from such a blank can be connected to a sheath by permitting the coupling flaps to engage in the slit between the back face part and the coupling part of a sheath. A further particularity of such a wrapping strip is that it is capable of co-operating with a varying number of sheaths by the presence of the third folding lines. In this respect, the wrapping strip can be brought to its closing position in a simple manner by inserting the free end of the wrapping strip into the slit between the back part and the coupling part of the adjacent sheath. This operation is further facilitated if the wrapping part ends in an insertion part.

The wrapping part and the back part of the wrapping strip substantially determine the appearance of the closed package. In the case where it is preferred that special attention is paid to this appearance, the wrapping strip may optionally be composed of different materials. For instance, the back part and the coupling flaps can be made of paper or cardboard, and the wrapping part of a material whose appearance is considered more attractive, the wrapping part comprising a portion that covers the back part. The wrapping part may be made from a pliable material, such as imitation leather.

BRIEF DESCRIPTION OF THE DRAWINGS

The package according to the invention will be further discussed and explained hereinafter with reference to the exemplary embodiments presented in the drawings. In these drawings:

FIG. 1 shows a first embodiment of a blank for forming a sheath;

FIG. 3 shows a blank for forming a wrapping strip;

FIG. 4 shows a package with a stack of coupled sheaths according to FIG. 2 with data carriers accommodated therein and enclosed by a wrapping strip made from the blank according to FIG. 3;

FIG. 5 shows the package according to FIG. 4 in the opened form, the sheaths being arranged so as to overlap like roof tiles;

FIG. 6 shows a second embodiment of a blank for forming a sheath; and

DESCRIPTION OF THE PREFERRED EMBODIMENT

Figure 2:
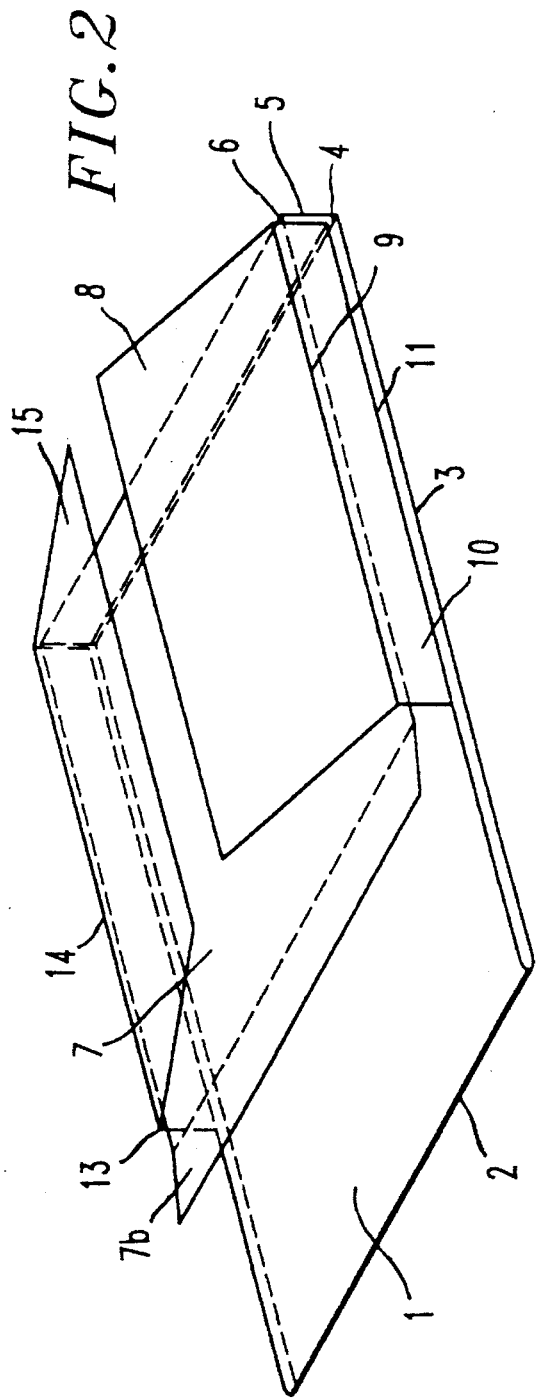
FIG. 2 shows a sheath formed from the blank according to FIG. 1.

The blank shown in FIG. 1 comprises a back face part 1, having attached thereto, by means of a folding line 2, a coupling part 3 of the same dimensions as the back face part 1, which coupling part is connected, by means of a folding line 4, to a bottom hinge panel 5, which is in turn connected, by means of a folding line 6, to a fold-back part 7, having the same width but a shorter length than the back face part 1 and comprising a fringe area 7b, bounded by a folding line 7a. The blank further comprises a first top wall part 8, having a length which is slightly smaller than the distance between the folding lines 6 and 7a and a width which is smaller than half the width of the back face part. By a folding line 9, the top wall part 8 is connected to a first lateral hinge panel 10, connected to an edge of the back face part 1 via a folding line 11, while a second top wall part 15 is connected to the opposite edge via a folding line 12, a second lateral hinge panel 13 and a folding line 14, which top wall part has the same dimensions as the first top wall part 8. Between their folding lines, the lateral hinge panels have a height which is practically equal to that between the folding lines of the bottom hinge panel 5.

For making a sheath as shown in FIG. 2 from the blank according to FIG. 1, the back face part 1 with the lateral hinge panels and top wall parts attached thereto are folded back about the folding line 2 over 180°, so that the back face part 1 comes to rest on the coupling part 3. Subsequently, the bottom hinge panel 5 and the fold-back part 7 are folded upwards about the folding line 4 into a position which is perpendicular to the plane of the drawing, whereupon the fold-back part is folded again over 90° about the folding line 6. Subsequently, the first top wall part 8 and the first lateral hinge panel 10 are folded, about the folding line 11, into a position perpendicular to the plane of the drawing, whereupon the first top wall part 8 is further folded about the folding line 9 over 90°. In a similar manner, the second lateral hinge panel 13 is brought to a position perpendicular to the plane of the drawing and the second top wall part 15 to a position pointing towards the first top face part 8. Finally, the fringe area 7b is folded upwards slightly about the folding line 7a to obtain the position shown in FIG. 2, although the two top face parts as shown in the drawing have sprung back slightly.

The blank shown in FIG. 3 comprises a back part 16, connected by a folding line 17 to a wrapping part 18, ending in an insertion part 18a bounded by a folding line 18b. The wrapping par 18 comprises a first group of folding lines 19a–19k and a second group of folding lines 20a–20k. The distance between two folding lines of one group is approximately equal to the height between the folding lines 4 and 6 of the bottom hinge panel 5. The distance between the folding line 19a of the first group and the folding line 20a of the second group is equal to the length of the coupling part 3 between the folding lines 2 and 4 thereof. The blank further comprises a first coupling flap 21, connected to the back part 16 by a folding line 22, and a second coupling flap 23, connected to the back part 16 via a folding line 24.

For composing a package as shown in FIG. 4, the coupling part 3 of a blank according to FIG. 1 is placed on the back part 16, while the folding line 4 is placed on the folding line 17. Subsequently, the coupling flaps 21 and 23 are folded towards each other about their folding lines 22 and 24 over 180° to abut against the coupling part 3, whereupon, by successively folding over the back face part 1 and the fold-back part 7, as well as the two top face parts 8 and 15, the sheath shown in FIG. 2 is completed. Typically, it will be preferred to accommodate a plurality of sheaths in the wrapping strip, for instance four as shown in FIG. 4. In that case, for folding over the top face parts 8 and 15, the coupling part 3 of a further blank according to FIG. 1 is placed on the fold-back part 7 of the sheath already coupled to the wrapping strip. After folding the top face parts of the last-mentioned sheath towards each other, the and any next sheath can be connected in the manner described above. Upon inserting a data carrier 25 into each sheath fitted, wrapping part 18 is wrapped around the snack of sheaths, the first and the second groups of folding lines 19a–19k, 20a–20k ensuring that sharp edges are formed on the top edges of the stack. Finally, the insertion part 18a is inserted into the slit between the back part 16 and the coupling part 3 of the bottom sheath, which yields the stack shown in FIG. 4.

In order to bring the package from this store position into a display position, the wrapping part 18 is pulled out of the above-mentioned slit and unwrapped from the stack. The sack can then be moved apart in a manner of overlapping roof tiles, which is possible because the coupling part 3 of one sheath moves across the top face parts of the subjacent sheath until the folding line 2 of the superjacent sheath abuts against the top edge of the top face parts of the subjacent sheath. Thus, the position shown in FIG. 5 can be obtained, wherein strips of the successive data carriers 25 are all displayed, while these data carriers 25 are also in a handy position for being pulled out of their respective sheaths. Reinserting a data carrier 25 into the sheath is facilitated by the fringe area 7b, slightly folded upwards, of the fold-back part 7.

It is observed that in the manner as shown in FIG. 2, the top face parts 8 and 15 of the top sheath of a stack may spring back slightly. If this is considered undesirable, these parts can be fixed in a horizontal position by connecting them by an adhesive strip. Another possibility is to provide the first top face part 8 with a projecting lip which can be inserted into a slit in the second top face part 15. Still another possibility is presented by using a sheath formed from a blank as shown in FIG. 6, comprising a back face part 31, a coupling part 32, a bottom hinge panel 33, a fold-back part 34 with fringe area 34a, a first lateral hinge panel 35, a top face part 36, a second lateral hinge panel 37 and an insertion part 38. The various parts are interconnected by means of folding lines.

Figure 7:
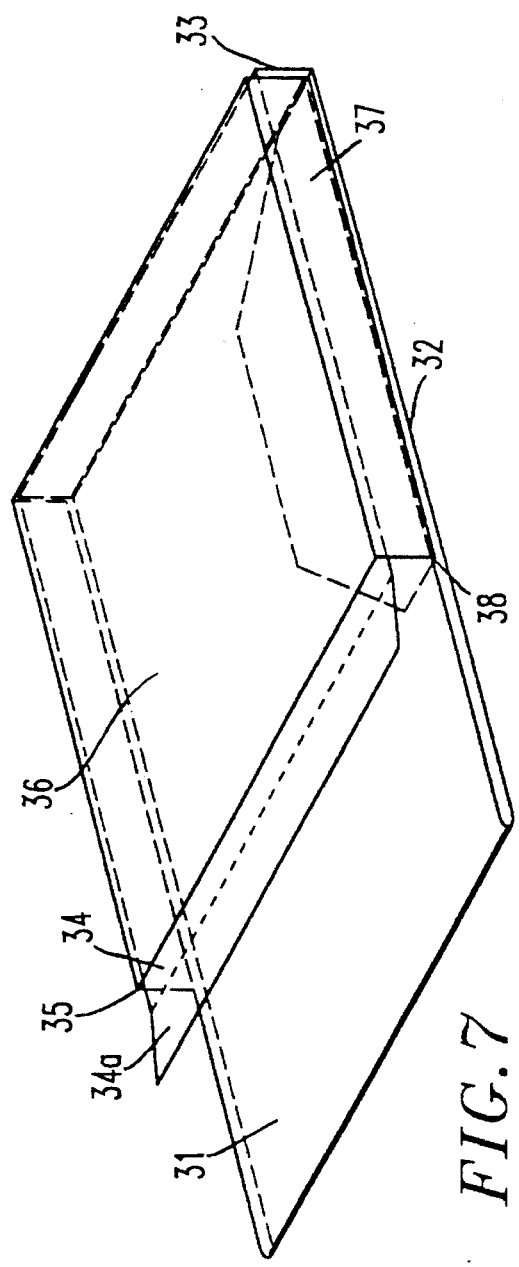
FIG. 7 shows a sheath formed from the blank according to FIG. 6.

A sheath to be made from such a blank is shown in FIG. 7. For this purpose, the back face part 31 and the parts 35–38 connected thereto are folded over into a position resting on the coupling part 32, whereupon the bottom hinge panel 33 is brought to a vertical position and the fold-back part 34 in a horizontal position above the back face part 31. Subsequently, the lateral hinge panel 35 is brought to a vertical position and the top face part 36 is further folded over to reach a horizontal position above the fold-back part 34. When the top face part 36 is folded over, care is taken that the insertion part 38 is inserted into the slit between the back face part 31 and the coupling part 32 and the lateral hinge panel 37 ends up in a vertical position. After folding the fringe area 34a slightly upwards, the sheath shown in FIG. 7 is obtained.

It will be clear that many modifications and variants are possible within the framework of the invention as laid down in the accompanying claims. For instance, in the package according to FIG. 4, portions of the data carriers are visible. If this is considered undersirable, the lateral hinge panels could be designed so as to extend along the entire edge. Also, the top face parts in those fringe areas could extend over the entire height of the data carrier, in which case the coupling part should, accordingly, be of a narrower design. In order to enclose a stack of sheaths on all sides, for instance in a sales package, two U-shaped parts could further be added, whose webs cover the side faces of the stack and whose legs are retained tightly by the closed wrapper.

I claim:

1. A package for storing and displaying a plurality of box-shaped articles the package comprising a plurality of sheaths, with one sheath for receiving each box-shaped article, each of said sheaths comprising:

an insertion opening;

a back face part having a first longitudinal side which forms a first edge of the insertion opening;

a top wall part having a longitudinal edge which forms a second edge of the insertion opening and recedes relative to the first longitudinal side; and a coupling part, attached to said back face part at the first longitudinal side thereof and extending behind the back face part relative to the top wall part from the first longitudinal side of the back face part towards a second, opposite longitudinal side of the back face part, the coupling part extending under the top wall part of the subjacent sheath of said plurality of sheaths, wherein the top wall part is hingedly attached to a longitudinal side of the back face part, said longitudinal side extending transversely to said first longitudinal side, and the coupling part extends to said second longitudinal side of the back face part, where a fold-back part is connected to the coupling part by a hinge part, the fold-back part extending in the direction of said first longitudinal side of the back face part under the top wall part, so that the back face part and the coupling part form a closed loop around the top wall part of the subjacent sheath.

2. A package according to claim 1, wherein the fold-back part extends beyond the receding second edge, formed by the top wall part of the insertion opening.

3. A package according to claim 1, further comprising a wrapping strip connected to the back face part or the coupling part of the first sheath of said plurality of sheaths and capable of being wrapped around a plurality of superjacent sheaths of said plurality of sheaths and coupled to the first-mentioned sheath thereby forming a closed wrapper.

4. A package according to claim 1, wherein a blank for one sheath of said plurality of sheaths comprises a rectangular back face part, a coupling part connected to the back face part by a hinge, a fold-back part connected to the coupling part by a hinge part that is parallel to the hinge means, and a first and second top wall part connected to the back face part by a first and second lateral hinge part respectively, wherein both first and second lateral hinge parts are perpendicular to the hinge means.

5. A package according to claim 1, wherein a blank for one sheath of said plurality of sheaths comprises a rectangular back face part, a coupling part connected to the back face part by a hinge, a fold-back part connected to the coupling part by a hinge part that is parallel to the hinge, a first top wall part connected to the back face part by a first lateral hinge part perpendicular to the hinge, and an insertion part connected to the top wall part by a second lateral hinge part parallel to the first lateral hinge part.

6. A package according to claim 4, wherein the hinge is formed by a folding line and the hinge part as well as the first and second lateral hinge parts are formed by a panel connected by folding lines to the parts which are adjacent to the hinge part and which are to be hingedly connected.

7. A package according to claim 3, wherein a blank for the wrapping strip comprises a rectangular back part whose dimensions correspond to the dimensions of the back face part of a sheath to be enveloped, said back part having coupling flaps connected thereto along two opposite sides by first folding lines and a wrapping part connected thereto along a third side of the rectangular back part by a second folding line, said wrapping part having a width at least equal to a back part dimension parallel to the second folding line and a length at least equal to the sum of a back part dimension perpendicular to the second folding line and twice a thickness of a stack of maximally receivable sheaths with box-shaped articles, the wrapping part comprising at least a group of third folding lines extending parallel to the second folding line and spaced apart at a distance corresponding to a thickness of a single sheath with box-shaped article.

8. A package according to claim 7, wherein the wrapping part ends in an insertion part.

9. A sheath for use in a package for storing and displaying a plurality of box-shaped articles, said sheath comprising:

an insertion opening;

a back face part having a first longitudinal side which forms a first edge of the insertion opening;

a top wall part having a longitudinal edge which forms a second edge of the insertion opening and recedes relative to the first longitudinal side; and a coupling part, attached to said back face part at the first longitudinal side thereof and extending behind the back face part relative to the top wall part from the first longitudinal side of the back face part towards a second, opposite longitudinal side of the back face part, the coupling part extending under the top wall part of the subjacent sheath of said plurality of sheaths, wherein the top wall part is hingedly attached to a longitudinal side of the back face part, said longitudinal side extending transversely to said first longitudinal side, and the coupling part extends to said second longitudinal side of the back face part, where a fold-back part is connected to the coupling part by a hinge part, the fold-back part extending in the direction of said first longitudinal side of the back face part under a top wall part of a subjacent sheath, so that the back face part and the coupling part form a closed loop around the top wall part of the subjacent sheath.

10. A blank for manufacturing a wrapping strip for use in a package for displaying a plurality of box-shaped articles, said blank comprises: a rectangular back part whose dimensions correspond to the dimensions of the back face part of a sheath to be enveloped, said back part having coupling flaps connected thereto along two opposite sides by first folding lines and a wrapping part connected thereto along a third side of the rectangular back part by a second folding line, said wrapping part having a width at least equal to a back part dimension parallel to the second folding line and a length at least equal to the sum of a back part dimension perpendicular to the second folding line and twice a thickness of a stack of maximally receivable sheaths with box-shaped articles, the wrapping part comprising at least a group of third folding lines extending parallel to the second folding line and spaced apart at a distance corresponding to a thickness of a single sheath with box-shaped article.

11. A blank according to claim 10, having a portion of the blank being stiffer than another portion of the blank.

12. A package according to claim 2, wherein a blank for one sheath of said plurality of sheaths comprises: a rectangular back face part, a coupling part connected to the back face part by a hinge, a fold-back part connected to the coupling part by a hinge part that is parallel to the hinge, and a first and a second top wall part connected to the back face part by a first and a second lateral hinge part respectively, said first and second hinge parts being perpendicular to the hinge.

13. A package according to claim 2, wherein a blank for one sheath of said plurality of sheaths comprises: a rectangular back face part, a coupling part connected to the back face part by a hinge, a fold-back part connected to the coupling part by a hinge part that is parallel to the hinge, a first top wall part connected to the back face part by a first lateral hinge part perpendicular to the hinge, and an insertion part connected to the top wall part by a second lateral hinge part parallel to the first lateral hinge part.

14. A package according to claim 5, wherein the hinge is formed by a folding line and the hinge part as well as the first and second lateral hinge parts are all formed by a panel connected by folding lines to the parts which are adjacent to the hinge part and which are to be hingedly connected.

15. A package according to claim 2, wherein a wrapping strip is connected to the back face part or the coupling part of a first sheath of said plurality of sheaths and capable of being wrapped around a plurality of superjacent sheaths and coupled to the first sheath thereby forming a closed wrapper.

* * * * *